United States Patent [19]
Spell

[11] 3,739,858
[45] June 19, 1973

[54] AGRICULTURAL IMPLEMENT
[76] Inventor: Perry W. Spell, Roseboro, N.C.
[22] Filed: Mar. 20, 1972
[21] Appl. No.: 236,085

[52] U.S. Cl. .................. 172/59, 172/111, 172/81, 64/2 P
[51] Int. Cl. ............................................ A01b 33/00
[58] Field of Search ...................... 172/59, 57, 110, 172/111, 96, 103, 125, 81, 82; 64/2 P, 15

[56] References Cited
UNITED STATES PATENTS
| | | | |
|---|---|---|---|
| 3,059,704 | 10/1962 | Kasatkin | 172/59 X |
| 2,308,392 | 1/1943 | Roepke | 172/111 X |
| 541,997 | 7/1895 | Fravega et al. | 64/2 P |
| 270,824 | 1/1883 | Michaelis | 172/110 X |
| 2,574,237 | 11/1951 | Barrow | 172/111 X |
| 2,625,867 | 1/1953 | Hands, Jr. | 172/59 X |

FOREIGN PATENTS OR APPLICATIONS
966,961   8/1964   Great Britain ....................... 172/59

Primary Examiner—Robert E. Pulfrey
Assistant Examiner—Stephen C. Pellegrino
Attorney—John G. Mills, III

[57] ABSTRACT

In abstract, a preferred embodiment of the present invention is an agricultural implement used as an earth scarifying device capable of operating between small, tender plants. This implement is designed to be attached to the rear of a tractor and operated by the power take-off thereof.

7 Claims, 15 Drawing Figures fig.1 fig. 2 fig.3 fig. 4 fig.5 fig.6 fig.7 fig.8 fig. 10 fig. 9 fig.11 fig.12 fig. 13 fig. 15 fig. 14

AGRICULTURAL IMPLEMENT

This invention relates to agricultural implements and more particularly to an improved cutter head for use on tractor mounted, power take-off driven, earth scarifying devices.

In the past, scarifying devices have been developed which are tractor mounted and power take-off driven to allow one man, driving a tractor, to remove grass, weeds and other undesirable plants from between rows and individual plants by scarifying the earth therearound. Such a device is shown and described in U.S. Pat. No. 3,530,944, issued Sept. 29, 1970, to the inventor of the present invention. Thus such present invention is an improved agricultural implement to more effectively accomplish the scarifying operation around young crops without bruising or otherwise damaging the same.

It is an object, therefore, of the present invention to provide an improved side arm assembly for earth scarifying devices.

Another object of the present invention is to provide a tractor mounted and driven earth scarifying device, including a plurality of generally bell-shaped flexibly mounted cutters.

Another object of the present invention is to provide, in an earth scarifying mechanism, a flexibly mounted cutter head with a guard means thereabout.

Another object of the present invention is to provide a header for earth scarifying cutters, including a plurality of flexibly mounted, depending cutter heads.

A further object of the present invention is to provide, in a flexible scarifying cutter, a guard means for preventing bruising or cutting of plants around which the scarifying operation is being conducted.

An even further object of the present invention is to provide an earth scarifying cutter head resiliently mounted for vertical movement up and down on its drive shaft whereby earth contours can more accurately be followed.

Another object of the present invention is to provide, in an earth scarifying device, means for holding the cutter head of such device in firm resilient contact with the earth.

Another object of the present invention is to provide, in an earth scarifying device, a weight for attachment to the cutter head of the same whereby more positive earth contact can be realized.

Other objects and advantages of the present invention will become apparent and obvious from a study of the following description and the accompanying drawings which are merely illustrative of such invention.

With further reference to the drawings, a tractor mounted frame such as that shown and described in U.S. Pat. No. 3,530,994 as indicated generally at 10. a drive system from the power take-off of the supporting tractor operates to give a source of rotative power to shaft 24 of frame 10 as described in the above referred to patent. Likewise, the cutting head or unit 12 of the present invention is mounted on housing 36 which is described in such Patent Grant.

The cutter unit 12 of the present invention includes a drive train housing 11 and a cutter drive housing 13. To the upper portion of the gear train housing 11 are secured support means 14. The end opposite the housing attachment of these support means are attached to the uprights of frame 10. These support means or braces give added rigidity between the cutter units and to such frame.

On the outer or cutter end of rotatable shaft 24 is fixedly mounted spur gear 15. Spur gear 16 meshingly engages gear 15 and is mounted on rotatable shaft 17. Either integrally formed with or fixedly secured to spur gear 16 is bevel gear 18. This latter gear has a greater diameter than the diameter of spur gear 16 as can clearly be seen in FIG. 5.

Because spur gear 15 has a greater diameter and thus a greater number of teeth about its circumference than does spur gear 16, this latter gear will turn at a greater RPM than its drive gear. Likewise because of the similarity in size between meshingly engaged bevel gears 18 and 19, this latter gear will rotate at approximately the same RPM as its driving gear 18.

Bevel gear 19 is rotatively mounted either on shaft 20 or can be fixedly mounted to shaft 20 which in turn is rotatively mounted relative to housing 11. If even greater speed in the cutter heads is desired, as will hereinafter be described in more detail, bevel gear 19 can be made of a lesser diameter than bevel gear 18.

Relatively small bevel gear 21 is adapted to meshingly engage bevel gear 19. Gear 21 is fixedly secured to one end of shaft 22 which is rotatively mounted. To the central portion of shaft 22 is fixedly secured spur gear 23. Because of the relatively small diameter and thus number of teeth of bevel gear 21 as compared to the diameter and number of teeth of spur gear 23, such spur gear will drive the smaller gears meshed therewith at a greatly increased RPM as set forth below.

Figure 7:
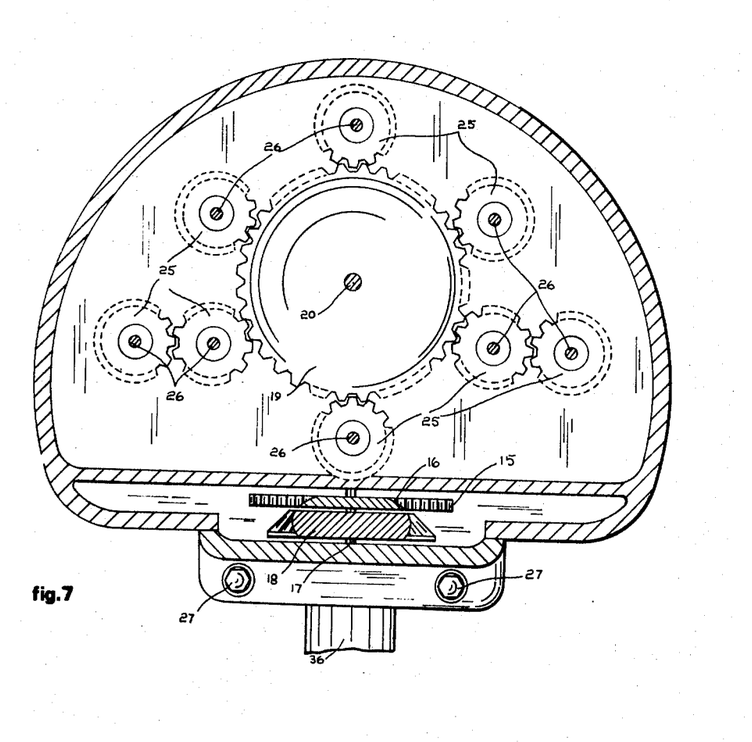
FIG. 7 is a section taken through lines 7—7 of FIG. 5.

About the periphery of spur gear 23, and in meshing engagement therewith, are a plurality of spur type shaft-drive gears 25. Some of these last mentioned gears not only mesh with drive gear 23, but also meshingly engage other shaft drive gears to rotate the same as can clearly be seen in FIG. 7.

Figure 5:
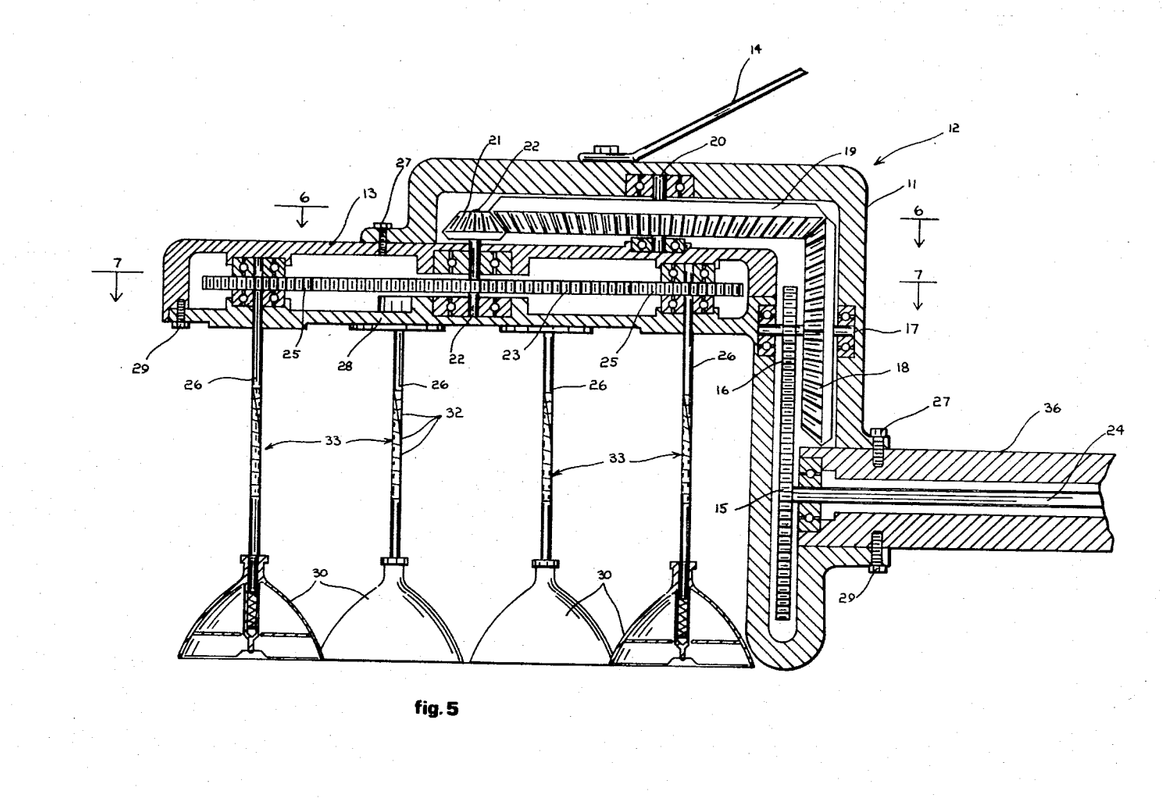
FIG. 5 is a sectional side elevational view of such unit.
Figure 6:
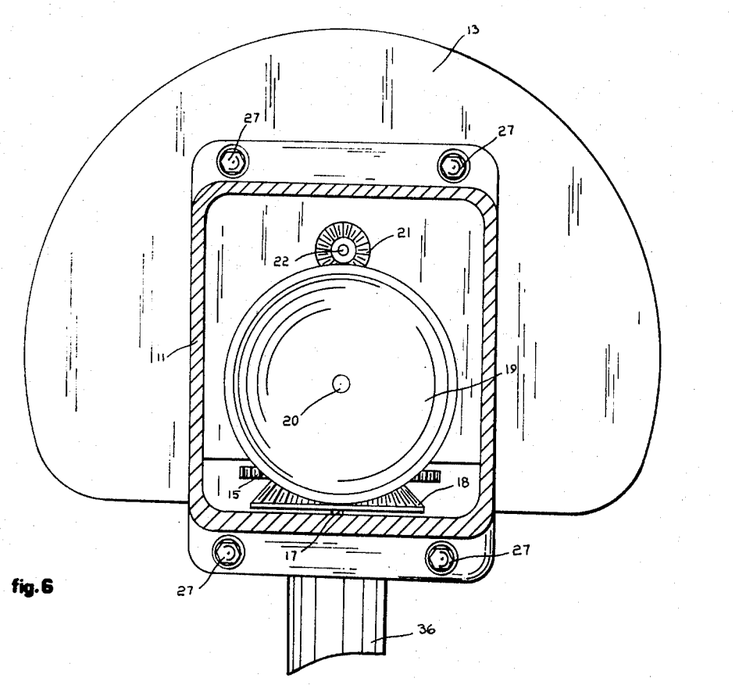
FIG. 6 is a section taken through lines 6—6 of FIG. 5.

Each of the drive shaft gears 25 are fixedly attached to a depending drive shaft 26 as can clearly be seen in FIG. 5.

Shafts 24, 17, 20, 22 and 26 are all shown as being bearing mounted for rotation but it is understood that shafts 17 and 20 can be fixed shafts with the respective gears mounted thereon being rotatively mounted.

Initial assembly as well as access for inspection and repair of the gear train is obtained through housing 11. This can be accomplished by removing gear train housing bolts 27 which ordinarily retain such housing in place. Access to the bearings, gears and shafts within the cutter drive housing is obtained through bottom plate 28 which is held in closed position by bolts 29.

To each of the drive shafts 26 is secured, at the end opposite the respective gears 25, a cutter head 30. This cutter head is preferably slideably mounted on shaft 26 for longitudinal movement up and down thereon. The cutter head is, of course, fixed relative to rotative movement on said shaft as will hereinafter be described in more detail.

As to the shafts 26 per se, these must be flexible and are formed either from a spring type resilient material or can include a plurality of joints, each having a slight amount of lateral play therein which, when taken as a whole, will give at least limited universal movement to the cutter head 30. This latter mentioned feature of the present invention is clearly disclosed in the enlarged portion of shaft 26 shown in FIG. 14.

Figure 14:
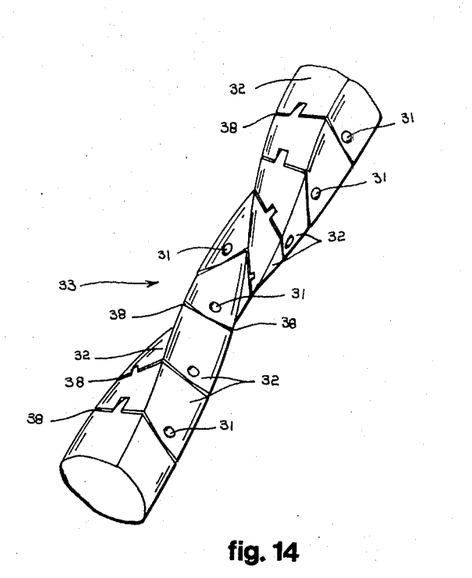
FIG. 14 is an enlarged perspective view of one form of the cutter head drive shaft.
Figure 15:
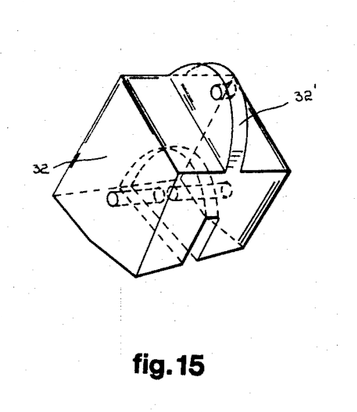
FIG. 15 is a perspective of a typical linkage of the drive shaft of FIG. 14.

FIG. 15 is a typical section or linkage of the portion of shaft 26 disclosed in FIG. 14. As can be seen, a slot is provided in the lower portion of the linkage with a tab outwardly projecting thereabove. Pins 31 pass through each block 32 and the tab 32' of the adjacent block. Because of the spacing 38 between blocks, a limited rocking movement or motion is provided with the sum total of this motion being adequate to allow the cutter heads to move in and out around the stalks of plants being cultivated. The flexible link portion of shafts 26 are indicated generally at 33.

Reference is now made more specifically to the cutter heads themselves, whether shaft 26 is a solid flexible shaft, a coil spring type flexible shaft or is flexible through the hereinabove described flexible link portion.

The cutter head 30 itself is generally bell shaped in configuration and has a keyed opening 34 extending downwardly along its longitudinal axis. The end of shaft 26 opposite gear 25 terminates in a rod like member 35 which has on its outward end a slip joint type spline 57. This spline is adapted to slidingly engage the key ways of opening 34. The shoulder 39 formed by the juncture of spline 57 and rod 35 is adapted to engage cap 40 thus limiting the longitudinal movement between the cutter head 30 and drive shaft 26.

A biasing means such as spring 37 is provided in opening 34 to bias the cutter head 30 to its most extended position on shaft 26. This bias means is, of course, of such a strength that when earth contours or obstacles are encountered, the cutter head will move upwardly on shaft 26 to allow such contour or obstacle to be cleared. As soon as the same is clear, the cutter head will, of course, be again extended by the bias means.

To prevent the undesired build-up debris in the upper portion of the bell shaped cutter head 30, a baffle or plate like member 41 is provided. This gives a generally flat surface on the interior of the bell which resists deposit accumulations.

The housing 42 for central opening 34 of the cutter head terminates in a finger like portion 43. A closed sleeve or cup like member 44 snugly mounts onto portion 43 and is held in place by set screw 45. To the end of member 44 is mounted scarifying blade 46. This blade can be either permanently mounted on member 44 or, preferably, is releasably mounted by means such as screw 47.

From the above, it is obvious that the depth at which cutter blade 46 scarifies can be set by moving member 44 and its attached blade up or down on portion 43 which either retracts the blade within the bell shaped cutter head or extend the same outwardly therebelow. Once the desired depth adjustment is made, set screw 45 is tightened to hold the adjustment. Thus it can be seen that blade 46 of cutter head 30 can be adjusted for optomium operation considering the composition, moisture content, etc., of the specific area or field being cultivated.

Since the cutter head 30 rotates at a relatively high RPM, there is a possibility of scarring or burning of the plants around which the device of the present invention is being used. This is particularly true with young, tender plants. To prevent this burning or abraiding effect, a guard such as that indicated generally at 48 can be provided. This guard is composed of a bearing mounted collar 49 which allows the guard to remain relatively stationary while the cutter head rotates.

Figure 8:
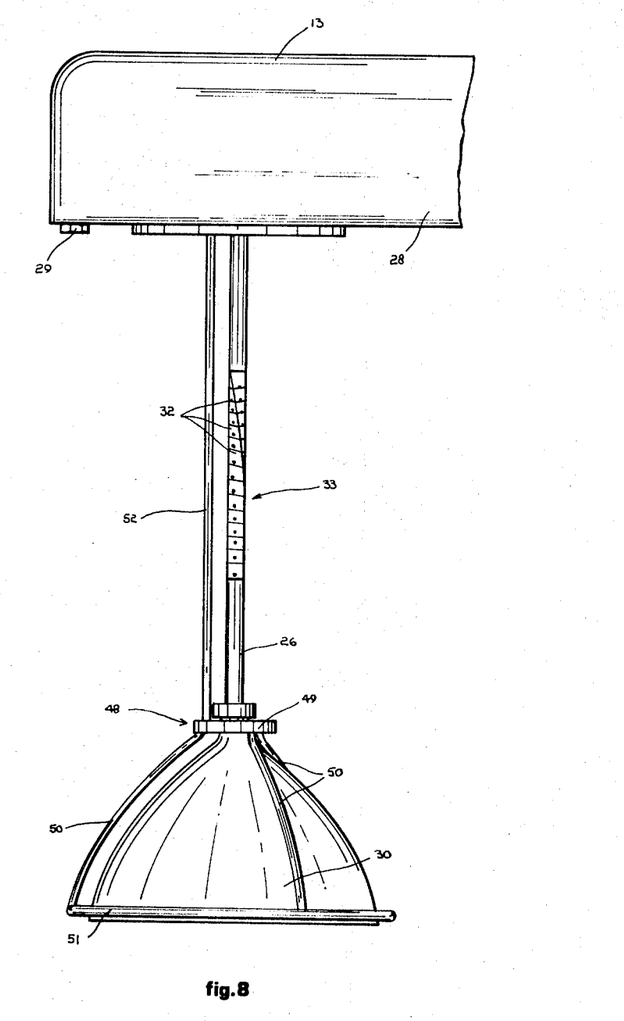
FIG. 8 is a side elevational view of a typical scarifying cutter and guard means.
Figure 9:
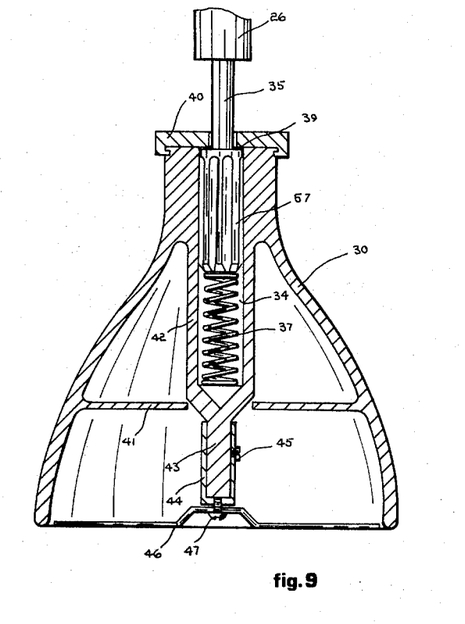
FIG. 9 is a sectional view of the cutter head on its flexible shaft showing such head in extended position.
Figure 10:
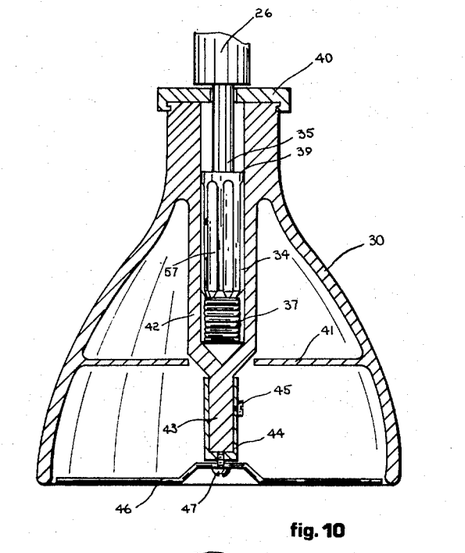
FIG. 10 is a sectional view showing the head in retracted or compressed position.
Figure 11:
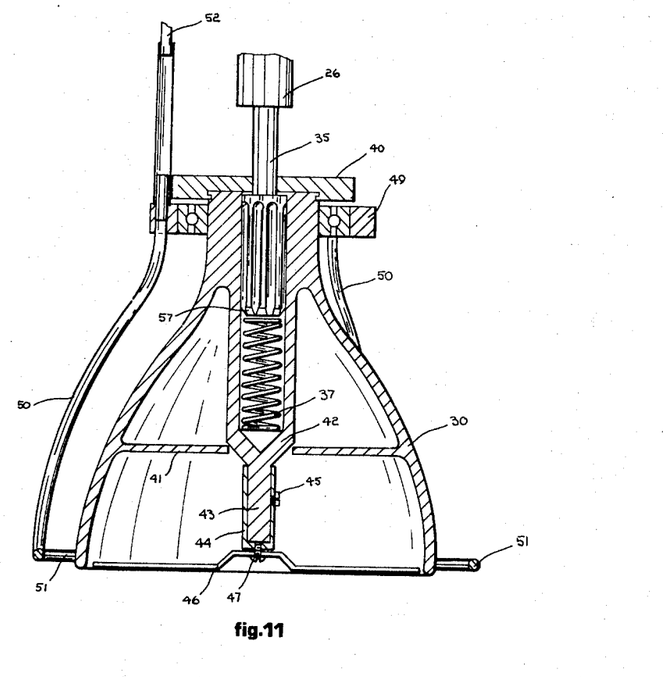
FIG. 11 is a cutaway elevational view of the cutter head showing details of the guard mounted thereabout.
Figure 12:
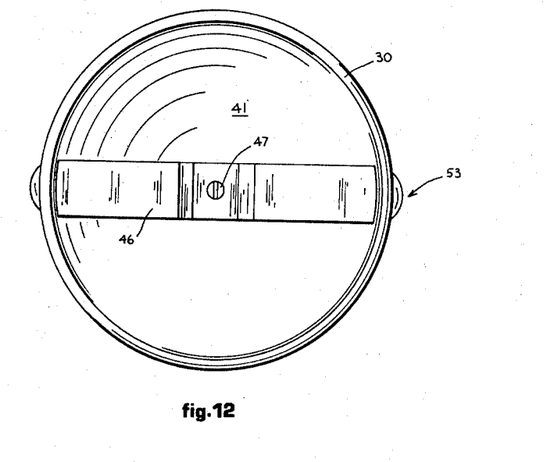
FIG. 12 is a bottom plan view of the cutter head.

Fixedly attached to the outer portion of collar 49 are a plurality of at least three contoured, depending, rod-like supports 50. To the end of these supports, opposite collar 49, is attached a ring-like plant guard 51. From the Figs., particularly FIGS. 8 and 11, it is obvious that plant guard 51 will engage the plants about which the scarifying device is operating and thus prevent the cutter head 30 from contacting the same.

To hold the collar 49 and its associated supports and plant guard in relatively fixed position against rotation with cutter head 30 and yet to allow the guard to move or flex with the movement or flexing of shaft 26 as plants are contacted during scarifying operations, a guard anti-rotation member 52 is provided which extends telescopically from collar 49 to the lower portion of housing 13. This member must be flexible enough so that the entire guard unit 48 can flex with cutter head 30 and yet must be stiff enough so that collar 49 will not rotate with such head. A flexible cable has been found to be adequate for the purposes of member 42 although other materials and configurations can obviously be used with success.

Figure 13:
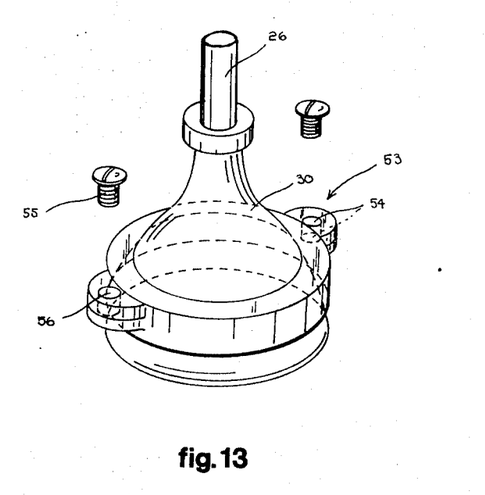
FIG. 13 is a perspective view of a typical cutter head with a weight mechanism added thereto.

To give more positive scarifying effect to the implement of the present invention, particularly when the earth is relatively hard due either to its natural composition or excessively dry weather conditions, a weight such as that indicated generally at 53 can be added to each of the cutter heads 30. This weight, although it could be in any one of a number of forms, is preferably a two-piece weight with a hinge pin 53 and is held together in operative position by bolt means 55 screwed into threaded opening 56. This weight forces its associated cutter head downwardly against the earth so that the scarifying blade 46 will have a more positive effect.

The cutter head weight hereinabove described can, of course, be used either with the guard or without the guard as deemed appropriate by the user of the device under operating conditions.

Figure 1:
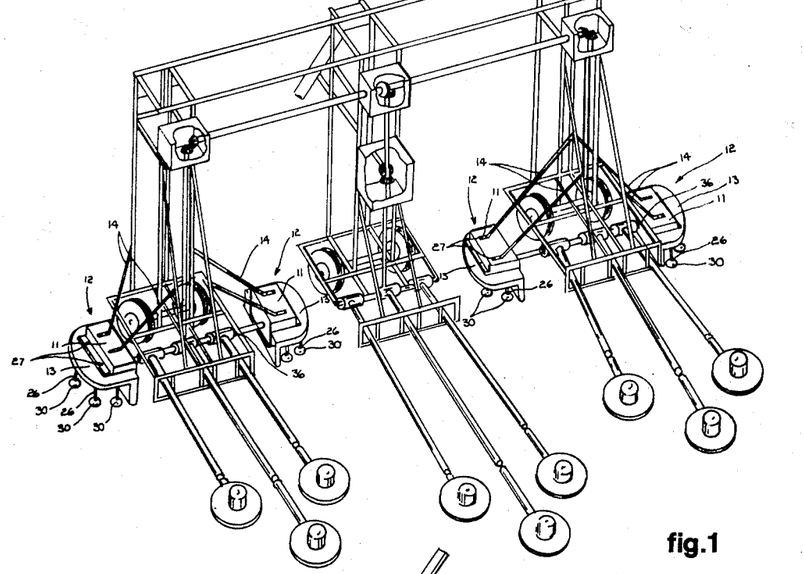
FIG. 1 is a perspective view of an earth scarifying implement with the improved scarifying means of the present invention attached thereto.
Figure 2:
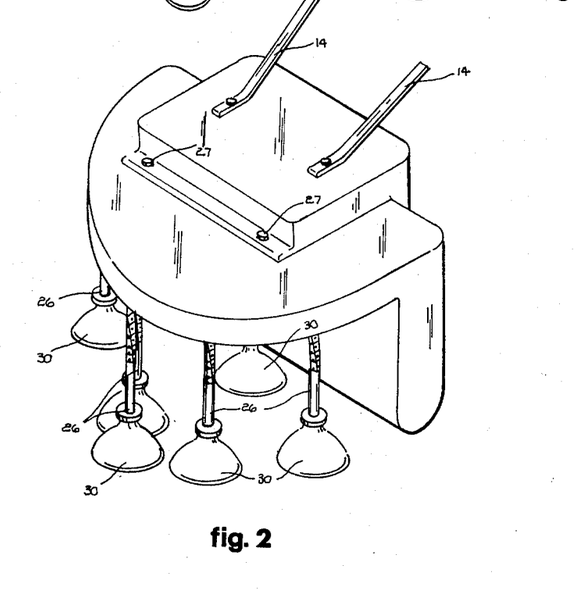
FIG. 2 is a perspective view of the scarifying unit of the present invention detached from its mounting mechanism.
Figure 3:
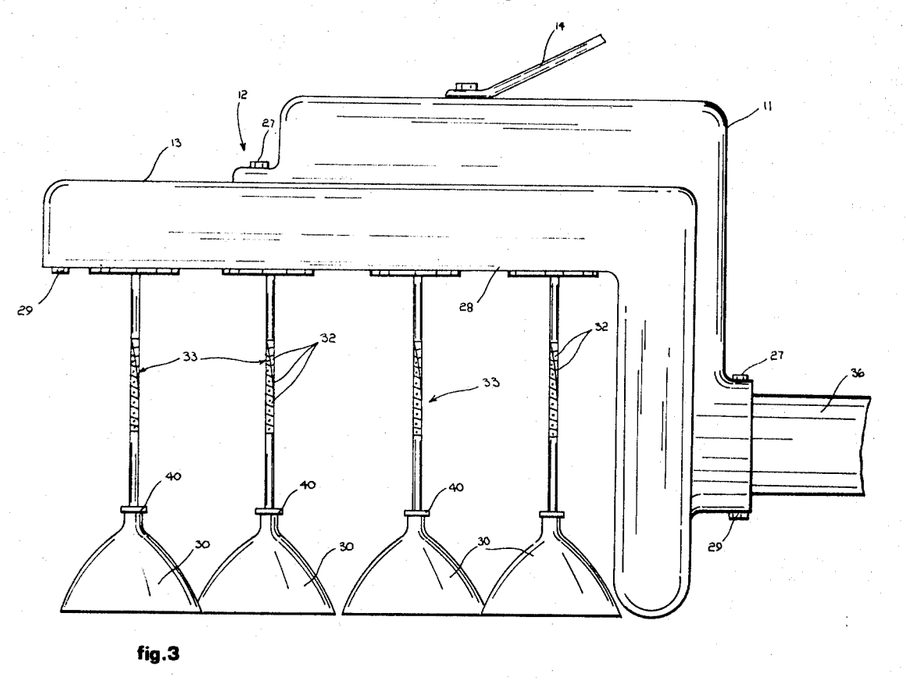
FIG. 3 is a side elevational view of the unit of the present invention.
Figure 4:
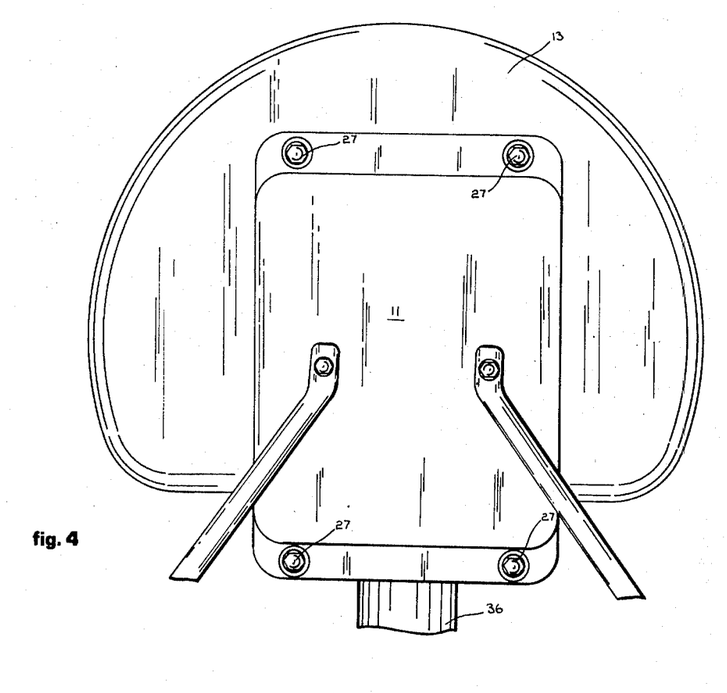
FIG. 4 is a top plan view of the same.

The device of the present invention is operated in a manner very similar to that described in the inventor's U.S. Pat. No. 3,530,944 in that each scarifying cutter head moves in and around each individual plant of the crop being cultivated. The supporting frame can have either a combination of weaving heads and cutter units as disclosed in FIG. 1 or it can have a plurality of the cutter units of the present invention to the exclusion of weaving heads. As disclosed in FIG. 1, the cutter units of the present invention are used to scarify the earth around the row plants while the scarifying arms, which move only up and down vertically, would be used to scarify the earth between rows.

In either case, rotative power is transmitted to each cutter unit by drive shaft 24 as described in U.S. Pat. no. No. 3,530,944. From drive shaft 24, and through the gear train of each individual cutter unit, the flexible drive shafts 26 are rotated. As these rotate at a relatively high RPM, so rotates their mounted cutter heads 30. As the frame 10 is moved across the field by its supporting tractor (not shown), the earth between the heads 30 is scarified. Sinces the swaths of the scarifying heads overlap one other, a wide area is cultivated.

When a crop plant is encountered by one of the cutter heads of the present invention, such head will move laterally to one side to let such plant pass thus scarifying around the plant without damaging the same. The reason for this lateral movement is, of course, the flexible drive shaft 26 which allows movement of the cutter heads in an infinite number of directions. Even with the plant guard as hereinabove described, the cutter heads will operate to move around the plants being cultivated without injuring the same and yet break up the soil and remove undesirable weed growths.

From the above, it is obvious that the present invention has the advantage of providing a highly efficient earth scarifying means which is gentle to the plants about which it operates. A further advantage of the present invention is to provide a simple, relatively inexpensive scarifying means for use with both tender and relatively mature crop plants. An even further advantage of the present invention is to provide an earth scarifying device wherein each individual cutter head can move both horizontally and vertically as plant encounter and earth contour dictates. The present invention also is provided with an advantageous means for controlling the pressures of the scarifying blade against the earth being cultivated.

The terms such as "upper," "lower," "top," "bottom" and so forth are used herein merely for convenience to describe the improved agricultural implement and its parts as oriented in the drawings. It is to be understood, however, that these terms are in no way limiting to the invention since the implement may obviously be disposed in many different positions when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. In an earth scarifying device mounted on a carrier means which also serves as a source of rotative power for said device, the improvement comprising: a main housing attached to said carrier means; a plurality of flexible, drive shaft means rotatively mounted at their upper ends to said housing and depending therefrom such that the lower ends thereof may flex and move relatively to the upper ends; a scarifying cutter head assembly operatively connected to the lower end of each of said flexible shaft means and moveable therewith in response to said cutter head assembly engaging plants and the like lying in the path thereof, said cutter head assembly including an outer housing structure having blade means adjustably fixed generally interiorly therein for scarifying the earth; and drive train means operatively connected between said power source and said plurality of shaft means whereby a swath of earth can be scarified with said flexible shafts allowing crop plants and the like to be skirted around.

2. The device of claim 1 wherein each cutter head assembly comprises: a keyed opening extending about the longitudinal axis thereof; a spline slidably confined with said keyed opening and having one end operatively connected to said flexible shaft, thereby allowing each of said cutter head assemblies to move axially relative to the flexible shaft means supporting the same; and spring means interposed between said spine and said cutter head assembly for biasing said cutter head downwardly relative to said flexible shaft means, whereby each of said cutter heads may float relative to the supporting flexible shaft means.

3. The device of claim 2 including a plurality of plant guards, each plant guard encompassing a respective cutter head assembly and including a series of rod like supports extending through a collar rotatively journaled on the respective cutter head assembly.

4. The device of claim 3 wherein a portion of each of said flexible drive shafts is composed of a plurality of loosely connected blocks.

5. The device of claim 3 wherein the cutter head is generally bell shaped in configuration and wherein said blade means is attached adjacent the flared opening therein.

6. The device of claim 3 including an anti-rotative member extending telescopically from said collar to the lower portion of said main housing.

7. The device of claim 6 including a removable weight structure disposed about each cutter head assembly for providing a positive scarifying effect thereto.

* * * * *